United States Patent
Roh et al.

(10) Patent No.: US 6,370,890 B2
(45) Date of Patent: Apr. 16, 2002

(54) REFRIGERATOR AND ITS METHOD FOR CONTROLLING THE SAME

(75) Inventors: Young Hoon Roh, Seoul; Kwang Choon Kim, Kyonggi-do, both of (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 09/759,460

(22) Filed: Jan. 16, 2001

(30) Foreign Application Priority Data

Mar. 30, 2000 (KR) .............................................. 00-16658

(51) Int. Cl.[7] .................................................. F25B 49/02
(52) U.S. Cl. .............................. 62/126; 62/161; 62/298
(58) Field of Search ........................... 62/125, 126, 127, 62/129, 130, 161, 162, 163, 164; 236/51, 94; 165/11.1

(56) References Cited

U.S. PATENT DOCUMENTS 5,947,371 A * 9/1999 Lee .......................... 62/161 X
6,179,214 B1 * 1/2001 Key et al. .................. 62/127 X
6,257,005 B1 * 7/2001 Beatty ....................... 62/126 X

* cited by examiner

*Primary Examiner*—Harry B. Tanner
(74) *Attorney, Agent, or Firm*—Birch, Stewart, Kolasch & Birch, LLP

(57) ABSTRACT

There are provided a refrigerator and method for controlling the same in which a data error generated in a main controller of the refrigerator can be repaired with an easy key operation. The refrigerator includes a refrigerator controller for controlling configurations related with refrigerating functions according to an algorithm previously set, a main controller for controlling the refrigerator controller or configurations related with additional functions other than the refrigerating functions to correspond to a command of a user, and for returning to an initial setup state according to a request of the user when there is generated a data error therein, and a restoration switch, set at a predetermined outer portion of the main controller, for inputting a restoration command of the user when the data error is generated in the main controller.

11 Claims, 3 Drawing Sheets

REFRIGERATOR AND ITS METHOD FOR CONTROLLING THE SAME

BACKGROUND OF THE INVENTION

1. Field of the Invention

The present invention relates to a refrigerator and, more particularly, to a refrigerator and its method for controlling the same in which a data error generated in a main controller of the refrigerator can be repaired with an easy key operation.

2. Description of the Related Art

A refrigerator is an appliance for making or keeping foods cold so that they stay fresh for a long period. It generally is configured of a freezing room for freezing the foods to store therein, a cooling room for keeping them cold and a freezing cycle for cooling the freezing room and cooling room. The refrigerator is a basic and important element in the kitchen and it becomes large-sized with increase in consumption and variation in living style into Western. Meantime, the kitchen is changed from a space for simply eating foods into a main living space for a family to spend time together, having conversations and taking meals. This requires a refrigerator with high-quality and large-size.

With a recent rapid development in information communication technology, electronic appliances also become multimedia. Accordingly, it is anticipated that a home electronic appliance has multiple functions related with various other appliances and, actually, there has been recently developed a refrigerator combined with a computer constructed in a manner that a liquid crystal display (LCD) is attached onto its door enabling its user to watch TV and connect a web site to enjoy the Internet. This refrigerator having the LCD and LAN connecting device provides the Internet and video telephone functions.

The above refrigerator including a high-speed microprocessor and a large-capacity hard disk operates by pushing a touch screen of a monitor attached onto its door or by a voice command through a microphone set therein. The user can check the current temperature of the refrigerator and the condition of food kept therein and also can obtain nutrition information, cooking information, etc. through the information window of the LCD. In addition, by using a camera set above the LCD, moving pictures and messages of the family can be recorded/reproduced and data such as MP3 file can be downloaded. This refrigerator can be employed as general headquarters of "home automation" when it is connected with other home electronic appliances such as telephone, air conditioner, TV, etc.

The configuration of a conventional refrigerator is described below with reference of attached drawings. FIG. 1 is a block diagram of a conventional refrigerator, and FIG. 2 is a block diagram of the main controller of the conventional refrigerator.

Referring to FIG. 1, the conventional refrigerator includes a refrigerator controller 11 for controlling functions and components thereof, a key input part 15 for inputting a predetermined key signal, a display 16 set at a predetermined portion of the outer face of the refrigerator to display image thereon, a main controller 13 for controlling the refrigerator controller 11 to perform an operation of the refrigerator corresponding to a key signal inputted and generally controlling the components, an Internet connecting part 14 for communicating with a remote terminal through the Internet, and a communication controller 12 for controlling data communication between the main controller 13 and refrigerator controller 11.

Referring to FIG. 2, the main controller 13 consists of a ROM 21 storing a basic input output software (BIOS) operating whenever the main controller is powered, a memory 22 for storing basic data such as a system booting data, operating system, etc. and application programs related with the refrigerator, manual information and corresponding image information, and a central processing unit (CPU) 23 executing control, operation and memory functions.

However, the aforementioned conventional refrigerator has the following problems. When the data stored in the memory of the main controller is damaged, the main controller must be externally connected to receive restoration data to recover the damaged data. This requires an additional after sale service in case that a device externally connected to the main controller and the restoration data are not kept at home.

SUMMARY OF THE INVENTION

Accordingly, the present invention is directed to a refrigerator and its method for controlling the same that substantially obviates one or more of the problems due to limitations and disadvantages of the related art.

An object of the present invention is to provide a refrigerator and method for controlling the same in which damage to data stored in the memory of the main controller thereof can be easily repaired by a simple operation of a switch at home.

To accomplish the object of the present invention, there is provided a refrigerator, comprising: a refrigerator controller for controlling configurations related with refrigerating functions according to an algorithm previously set; a main controller for controlling the refrigerator controller or configurations related with additional functions other than the refrigerating functions to correspond to a command of a user, and for returning to an initial setup state according to a request of the user when there is generated a data error therein; and a restoration switch, set at a predetermined outer portion of the main controller, for inputting a restoration command of the user when the data error is generated in the main controller.

To accomplish the object of the present invention, there is also provided a method for controlling a refrigerator including a first memory storing an operating system and application programs, a second memory storing a restoration program and a system booting program, a restoration switch through which a restoration command is inputted and a storage storing BIOS, the method comprising the steps of: when a user inputs the restoration command through the restoration switch, booting up the system and transferring an booting-up sequence to the second memory; executing the restoration program previously stored in the second memory to install the programs of the second memory in the first memory; and resetting the system upon completion of the program installation in the first memory.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Figure 1:
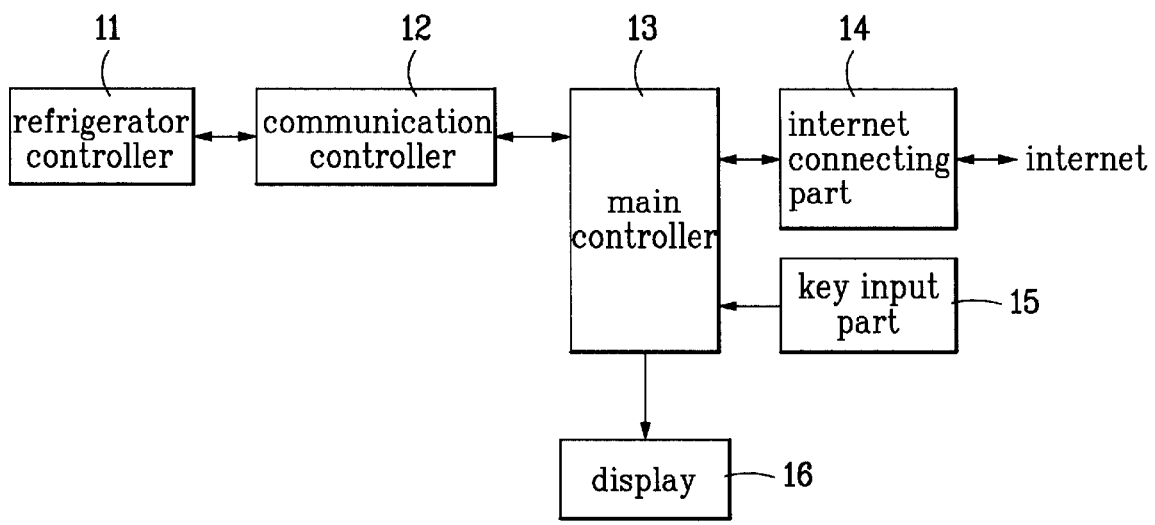
FIG. 1 is a block diagram of a conventional refrigerator.
Figure 2:
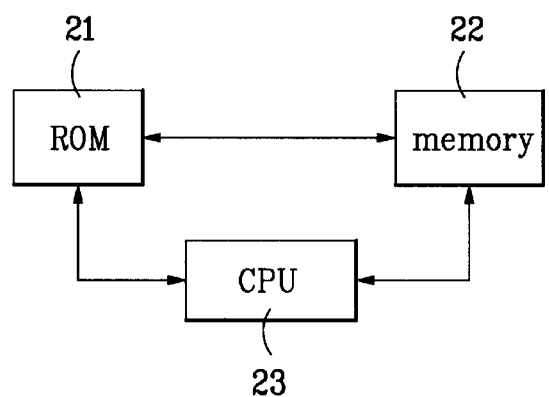
FIG. 2 is a block diagram of the main controller of the conventional refrigerator.
Figure 3:
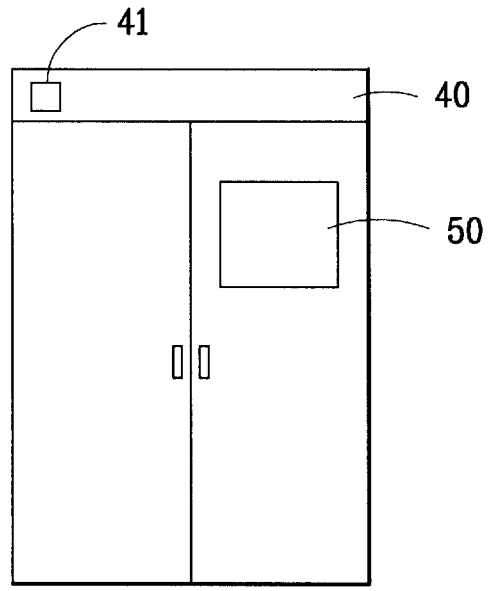
FIG. 3 is a front view of a refrigerator according to the present invention.

Reference will now be made in detail to the preferred embodiments of the present invention, examples of which are illustrated in the accompanying drawings. FIG. 3 is a front view of a refrigerator according to the present invention, FIG. 4 is a block diagram of the main controller of the refrigerator according to the present invention, and FIG. 5 is a flow diagram showing a method for controlling the refrigerator according to the present invention.

Referring to FIG. 3, the refrigerator of the invention includes a key input/display part 50 for inputting a request of its user and displaying a screen corresponding to the request, a main controller 40 for controlling parts related with additional functions other than refrigerating function, to correspond to the request inputted through the key input part 50, and, in case of generation of a data error, returning the state of the refrigerator to an initial setup state according to a request of the user, and a restoration switch 41, set at a predetermined outer portion of the main controller 40, by which the user inputs a restoration command when the data error is generated in the main controller 40. Here, The display part 50 uses a liquid crystal display (LCD) and the key input part 50 uses a touch panel.

Figure 4:
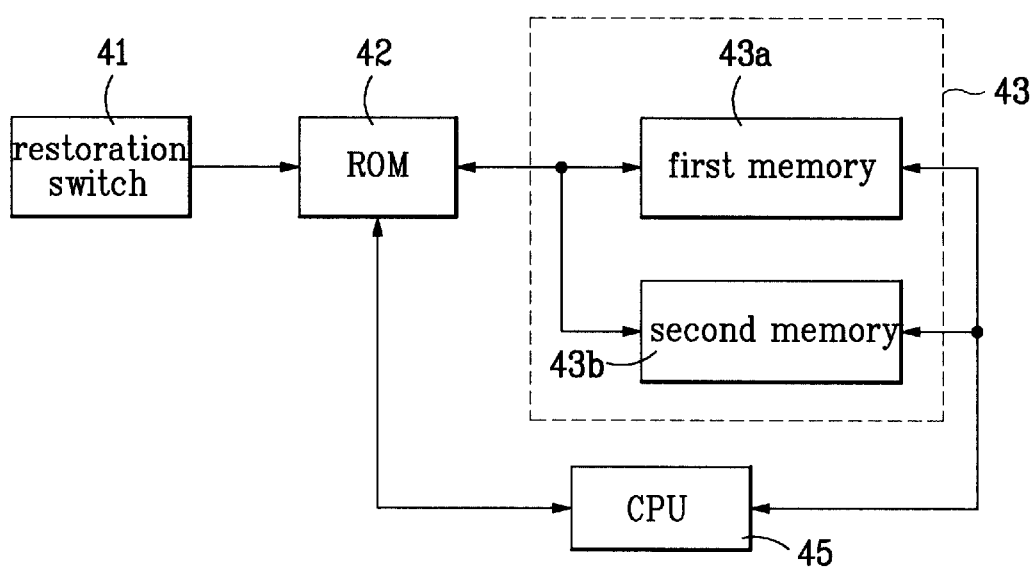
FIG. 4 is a block diagram of the main controller of the refrigerator according to the present invention.
Figure 5:
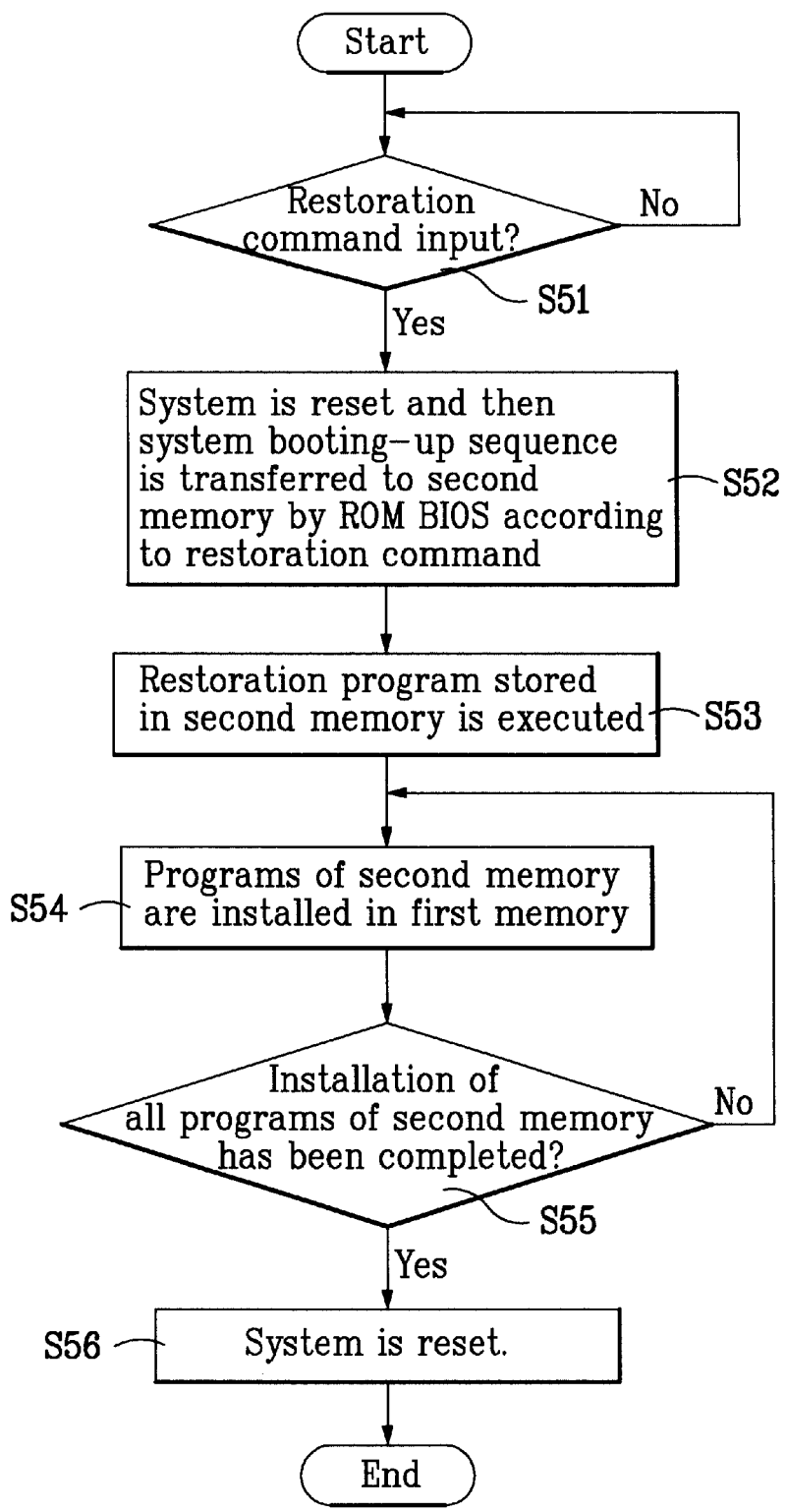
FIG. 5 is a flow diagram showing a method for controlling the refrigerator according to the present invention.

Referring to FIG. 4, the main controller 40 includes a storage (ROM) 42 storing a basic input output software (BIOS) according as the restoration command is inputted through the restoration switch 41 or not, a memory 43 storing at least an operating system and application programs related with the refrigerator, and a CPU 44 for performing a control operation corresponding to operation commands of the user in accordance with the programs stored in the memory 43. Further, the main controller 40 may additionally includes a multimedia function such as video card and sound card, or hardware with a variety of functions.

The memory 43 consists of a first memory 43a for storing a system booting program, an operating system for operating the main controller and application programs related with the refrigerator provided by its manufacturer, and a second memory 43b for storing a system booting program and a restoration program. Here, the first memory 43a functions as the memory of the main controller of the conventional refrigerator. That is, when the main controller 40 is powered, the system is booted up by the ROM 42 and first memory 43a and the operating system and application programs previously stored in the first memory 43a are executed.

The second memory 43b stores the restoration program including data for restoring the first memory 43a when the data previously stored in the first memory 43a is damaged, that is, the system booting data for booting the main controller. Here, the system booting data includes COMMAND.COM, IO.SYS, MSDOS.SYS, etc. and the restoration program includes an operating system installation program and a program for installing the application programs related with the refrigerator. In addition, there may be further included an Internet connection part (not shown) for upgrading the data of the memories through the Internet.

The method for controlling the refrigerator according to the present invention is explained with reference to FIG. 5.

First of all, it is judged if the restoration command is inputted to the restoration switch (S51). This restoration command is inputted by a user using the refrigerator having the main controller attached thereto to the restoration switch when the user finds through the LCD attached onto a predetermined portion of the door of the refrigerator that the main controller does not operate normally or it is not booted up due to damage to the system booting data or operating system data of the first memory, or the application programs related with the refrigerator are not executed.

When it has been judged that the restoration command is inputted to the restoration switch (S51), the system is reset and the ROM contained in the main controller boots up the main controller through the system booting data previously stored in the second memory (S52). Then, the ROM executes the restoration program previously stored in the second memory (S53).

Upon execution of the restoration program, the system booting data, operating system and application programs which are previously stored in the second memory are installed in the first memory (S54). Subsequently, it is judged if the programs of the second memory have been installed in the first memory (S55). Upon completion of the program installation in the first memory, the system is booted up (S56). The restoration program has the operation system installation file and file for installing various application programs related with the refrigerator.

Moreover, the main controller of the refrigerator according to the present invention can be connected to the Internet through the Internet connecting part. Accordingly, the main controller can be upgraded in terms of software by downloading the operating system and application programs stored in the second memory through periodic Internet access.

As described above, according to the refrigerator and method for controlling the same of the present invention, when the data of the memory of the main controller of the refrigerator is damaged, this damaged can be easily repaired through a simple operation of the switch without externally connecting the main controller to restore the data.

It will be apparent to those skilled in the art that various modifications and variations can be made in the refrigerator and method for controlling the same of the present invention without departing from the spirit or scope of the invention. Thus, it is intended that the present invention cover the modifications and variations of this invention provided they come within the scope of the appended claims and their equivalents.

What is claimed is:

1. A refrigerator, comprising:
   a refrigerator controller for controlling configurations related with refrigerating functions according to an algorithm previously set;
   a main controller for controlling the refrigerator controller or configurations related with additional functions other than the refrigerating functions to correspond to a command of a user, and for returning to an initial setup state according to a request of the user when there is generated a data error therein; and
   a restoration switch, set at a predetermined outer portion of the main controller, for inputting a restoration command of the user when the data error is generated in the main controller.

2. The refrigerator as claimed in claim 1, wherein the main controller includes:
   a memory storing at least an operating system and application programs related with the refrigerator;
   a storage storing BIOS according as the restoration command is inputted through the restoration switch or not; and
   a CPU for performing a control operation corresponding to a command of the user according to the programs stored in the memory.

3. The refrigerator as claimed in claim 2, wherein the storage is a ROM.

4. The refrigerator as claimed in claim 2, the memory includes:
   a first memory for storing a system booting program, an operating system for operating the main controller, and application programs related with the refrigerator provided by a its manufacturer; and
   a second memory for storing a system booting program and a restoration program.

5. The refrigerator as claimed in claim 4, wherein the restoration program is an operating system installation program.

6. The refrigerator as claimed in claim 4, wherein the program is a program for installation of the application programs related with the refrigerator provided by its manufacturer.

7. The refrigerator as claimed in claim 1, further comprising an Internet connection part for connecting the main controller to the Internet to upgrade the programs stored in the second memory through data communication between the main controller and the Internet.

8. The refrigerator as claimed in claim 4, further compromising an Internet connection part for connecting the main controller to the Internet to upgrade the programs stored in the second memory through data communication between the main controller and the Internet.

9. A method for controlling a refrigerator including a first memory storing an operating system and application programs, a second memory storing a restoration program and a system booting program, a restoration switch through which a restoration command is inputted and a storage storing BIOS, the method comprising the steps of:
   when a user inputs the restoration command through the restoration switch, booting up the system and transferring an booting-up sequence to the second memory;
   executing the restoration program previously stored in the second memory to install the programs of the second memory in the first memory; and
   resetting the system upon completion of the program installation in the first memory.

10. The method as claimed in claim 9, wherein the booting-up sequence is transferred to the second memory by the BIOS of the storage according to the restoration command inputted through the restoration switch after booting up of the entire system.

11. The method as claimed in claim 9, wherein the step of installing the programs of the second memory in the first memory includes the steps of:
   booting up the system by using the system booting program previously stored in the second memory; and
   re-installing the operating system and application programs in the first memory by using the restoration program of the second memory.

* * * * *